July 20, 1965
P. PIPERSKY ETAL
3,195,774
DEVICE FOR MONITORING THE VOLUME OF LIQUID
DISPENSED THROUGH A VALVE
Filed April 27, 1964
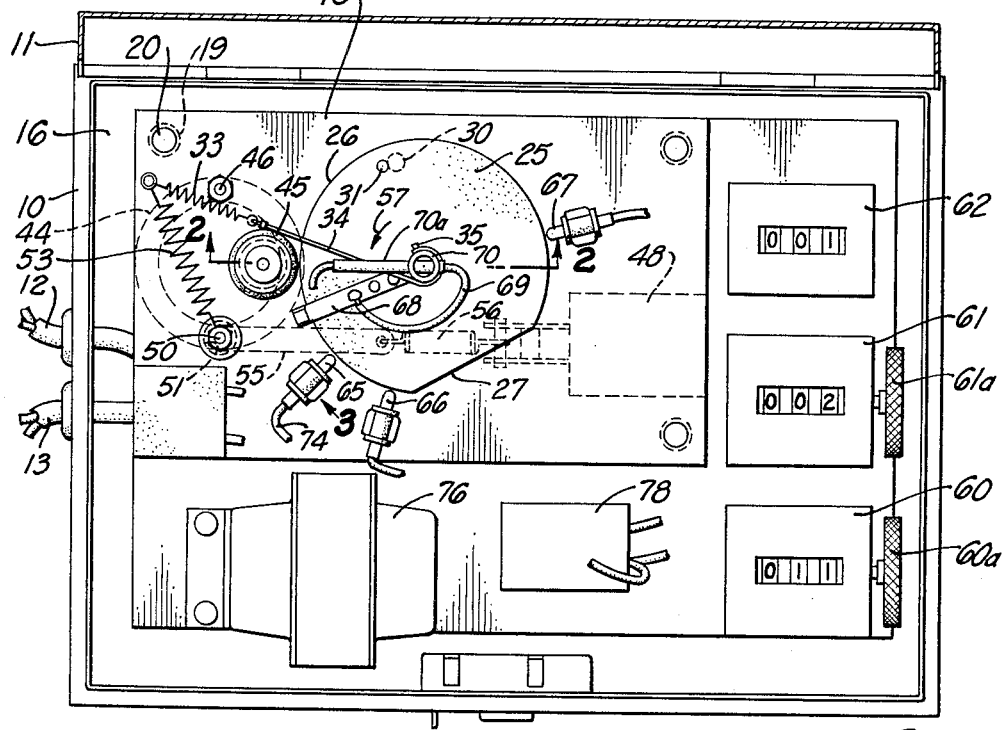
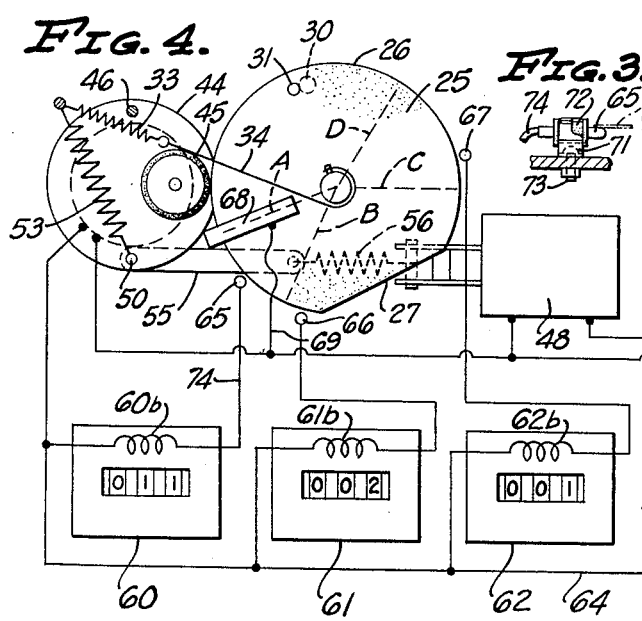
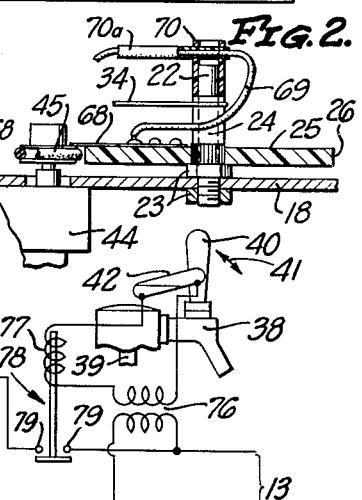
INVENTORS
PAUL PIPERSKY,
EMIL PIPERSKY
BY THEIR ATTORNEYS
HARRIS, KIECH, RUSSELL & KERN United States Patent Office 3,195,774
Patented July 20, 1965

3,195,774
DEVICE FOR MONITORING THE VOLUME OF LIQUID DISPENSED THROUGH A VALVE
Paul Pipersky and Emil Pipersky, both of 5023 Rosecrans, Hawthorne, Calif.
Filed Apr. 27, 1964, Ser. No. 362,594
16 Claims. (Cl. 222—26)

Our invention relates to the volumetric metering of fluids and more particularly to a monitoring device indicating or recording at a remote point the total volume or units of volume of liquid discharged in increments through a valve.

The invention is particularly applicable to the metering or monitoring of beer and will be exemplified as a monitoring device indicating to a tavern manager the volume of beer dispensed in increments over a selected period of time, typically a day.

In the usual tavern it is conventional to dispense kegged beer through a hand-operated valve or spigot into containers of various size. For example, beer is commonly sold in glasses, of about 10 oz. capacity and pitchers, of about 48 oz. capacity. It is desirable that the tavern manager know the total number of glasses and pitchers dispensed in a period of time corresponding to cash receipts. It is an object of the invention to provide such a system.

Tavern owners have experienced substantial losses because of inability to check receipts with the volume of beer dispensed. Waiters may withhold a portion of the cash paid by table customers or may report sales of lower-volume glasses as compared with higher-volume pitchers. Bartenders likewise have been known to dispense larger volumes of beer while reporting or registering smaller amounts. There is a need for a device that can monitor the volume dispensed for comparison with dollar receipts, chits or sales slips. It is an object of the invention to provide such a device. A further object is to provide a monitoring or counting device that may be located at a point remote from the bar area, for example in the tavern manager's office.

The dispensing of beer presents particular problems in view of its tendency to foam. The monitoring device must be capable of permitting the bartender to dispense final increments sufficient to compensate for decreasing foam volume without registering, all to the end that a customer may receive a glass or pitcher that is substantially full. It is an object of the invention to provide a monitoring device of such capability.

On the other hand it is an object of the invention to provide a monitoring device which will register or warn of any attempt on the part of the bartender to fill a plurality of pitchers during a single valve actuation. This and other attempts at dishonesty are discouraged by the invention.

It is a characteristic of beer that the valve or spigot must be fully opened to avoid forming an excess amount of foam. Correspondingly we have found it possible to develop a monitoring device responsive to the time the spigot is open and which will register the volume of beer dispensed. It is an object of the invention to provide a monitoring or metering device for fluid responsive to volumetric flow as determined by the time a spigot or valve is fully opened.

A further object is to provide such a monitoring device which includes counters recording different volumetric units dispensed so as to give an indication of the totals of the different volumes.

A further object is to provide a monitoring device which is foolproof in the sense that it is difficult or impossible for the bartender to dispense amounts of beer that are not properly recorded.

Further objects and advantages of the invention will be evident to those skilled in the art from the following description of an exemplary embodiment.

Referring to the drawings:

FIG. 1 is a top elevational view of a box-enclosed monitoring device of the invention;

FIG. 2 is a fragmentary sectional view taken along the line 2—2 of FIG. 1;

FIG. 3 is a fragmentary view of one switch contact, taken in the direction of the arrow 3 of FIG. 1; and FIG. 4 is a view diagrammatically illustrating the electrical connections of the device.

The monitoring device of FIG. 1 is shown mounted in a metal box 10 closed by a hinged cover 11. A valve-control circuit 12 and a power circuit 13 enter the box. A base panel 16 fits into the bottom of the box and a mounting member 18 is positioned thereabove by tubular spacers 19 surrounding bolts 20.

As best shown in FIG. 2 an upright pivot pin 22 is secured to the mounting member 18 by nuts 23 or by other means. Journaled on the pivot pin 22 is a sleeve 24 secured centrally in a circular timing member 25 having a circular periphery 26 which is cut away at one position to provide a depression 27 (FIG. 1) for a purpose to be described.

The mounting member 18 carries a stop element 30 which may comprise an upright post near the periphery of the timing member 25. This stop element is adapted to be engaged by a depending stop member 31 carried by the timing member to determine the initial or starting position of the timing member. The timing member is resiliently biased toward this initial position by an end-anchored tension spring 33 connected to a cord 34 which extends at least partially around the sleeve 24, being anchored thereto at 35.

The monitoring device is adapted to be used in conjunction with a valve or spigot 38 (FIG. 4) connected by a pipe 39 to dispense beer from a keg, not shown. The valve or spigot 38 provides a manually-actuated handle 40 pivoted to move in the direction of the double-headed arrow 41 from the valve-closed position shown to a valve-open position in which beer is dispensed from the spigot into smaller glasses or mugs or larger pitchers.

Means is provided for angularly advancing the timing member 25 from its initial position upon opening of the valve 38, the advancement being a function of elapsed time and continuing until the handle 40 is returned to the valve-closed position. Such functions are performed by a switch 42 secured to the handle and operatively connected to a suitable drive means for the timing member. This drive means includes an electric motor 44 positioned between the base panel 16 and the mounting member 18 and a suitable clutch means operatively connecting the motor to the timing member during the time that the valve 38 is open.

The electric motor 44 carries a geared-down friction wheel 45 adapted to drive the timing member 25 by frictional engagement with the circular periphery 26. The clutching function is performed by pivoting the motor 44 to the underside of the mounting member 18 to swing about a pivot member 46. Engagement and disengagement of the clutch means is effected by energizing and de-energizing a solenoid 48 in response to the opening and closing of the switch 42 carried by the handle of the valve 38. An actuating pin 50 carried by the motor 44 extends upward through a somewhat larger opening 51 in the mounting member 18 permitting limited arcuate movement of the motor. A spring 53 above the mounting member 18 resiliently biases the motor 44 into an unclutched position, shown in FIGS. 1 and 4, in which the friction wheel 45 is spaced slightly from the circular periphery 26 of the timing member 25. The armature of the solenoid 48 is connected to the actuating pin 50 at a position below the mounting member 18 by a link 55 and a spring 56. Energization of the solenoid 48 moves the friction wheel 45 into driving relationship with the circular periphery 26 of the timing member to turn the latter from its initial position in the direction of the arrow 57. Such motion continues until the solenoid is de-energized by closing of the valve 38 or until the timing member reaches an end position to be described.

Means is provided for recording the degree of angular movement of the timing member 25 during the time that the valve 38 remains open. In the preferred practice of the invention this means includes a plurality of electric digital counters, exemplified as first, second and third counters 60, 61 and 62. The counters 60 and 61 are resettable to zero by reset wheels 60a and 61a. The counter 62 is usually not resettable as it serves primarily a "policeman" function, as will be described. Each counter contains the usual advancement coil 60b, 61b and 62b advancing the counter one unit upon each energization. As best shown in FIG. 4 one terminal of each advancement coil is connected to a common ground 64 representing one conductor of the power circuit 13. The remaining terminals of the advancement coil are connected respectively to first, second and third switch contacts 65, 66 and 67 adapted to be sequentially engaged by the extended end of a master switch contact 68 mounted on the timing member 25. This master switch contact 68 is energized through a flexible lead 69 extending through a stationary sleeve member 70 attached to the top of the pivot pin 22. A sleeve of insulating material 70a extends into the sleeve member 70 and suspends the lead 69 above the mechanism.

Each of the first, second and third switch contacts is preferably mounted as suggested in FIG. 3. This mounting includes a U-shaped spring clip 71 releasably retaining a spool-like insulator 72 through which centrally extends the switch contact positioned to be wiped by the master switch contact 68. The U-shaped spring clip 71 is secured to the mounting member 18 by a suitable bolt 73. A suitable conductor 74 leads from the switch contact to the corresponding advancement coil. The first, second and third switch contacts 65, 66 and 67 are spaced angularly from each other and from the initial position of the master contact 68 as determined by the relative volumes to be counted, as will be explained.

Referring particularly to FIG. 4, the preferred manner of operatively connecting the valve 38 and the clutch means is through use of the switch 42, preferably a mercury switch mounted on the handle 40 in such position that the mercury does not bridge its contacts when the handle is upright and the valve 38 closed but does bridge such contacts and close the switch when the handle is pulled forward to open the valve 38 completely. These switch contacts are preferably in a low-voltage circuit to avoid any possible injury to personnel. As shown a step-down transformer 76 is connected across the power circuit 13 at all times. Its low-voltage secondary winding is connected in series with the switch 42 and an actuating coil 77 of a relay 78. The contacts 79 of this relay are in the power circuit 13 and close upon opening of the valve 38 to apply the potential of the power circuit to the solenoid 48, the master contact 68 and the motor 44 to energize these elements simultaneously. The result is to turn the friction wheel 45 and bring it into driving engagement with the timing member 25 to start its anticlockwise movement.

In the exemplified embodiment of the invention the radial dotted lines of FIG. 4 suggest the position of the master contact 68 at four positions, starting from the initial position A. In the time required to dispense a glass of beer the master switch contact 68 moves from position A to position B. Somewhere near the middle of this movement the first switch contact 65 is engaged to advance the counter 60 one unit. If a pitcher of beer is being filled the master switch contact 68 will move beyond the B position, promptly engaging the second switch contact 66 and advancing the counter 61 one unit. When at position C the pitcher is full. Any attempt to place a new pitcher below the valve 38 without actuation of the handle 40 causes the master contact 68 to continue its movement to engage the third switch contact 67 and actuate the counter 62 to advance it one unit. If the valve 38 continues to be held open movement of the master switch contact 68 will continue to approximately position D, representing the aforesaid end position, at which time the depression 27 of the circular periphery 26 will be opposite the friction wheel 45. The diameter of the opening 51 is such as to limit the movement of the friction wheel toward the pivot axis of the timing member 25 so that the friction wheel cannot engage the bottom of the depression in driving relationship. As a consequence the timing member 25 stops in the position D with the friction wheel 45 rotating in holding engagement with the periphery of the timing member at a position adjacent the depression. This holds the timing member in the end position during continued operation of the motor.

After a period of time the counter 61 will show the number of pitchers dispensed. The number of glasses dispensed will be the difference between the digital readings of counters 60 and 61. Any change in the reading of the third counter 62 will indicate digitally the number of times, if any, that an attempt has been made to dispense more than one pitcherful during a single opening of the valve 38. This third counter is in effect a "policeman" counter and serves to deter intentional dishonest operations. It will be clear that additional switch contacts can be employed in such angular relationship as to count other or intermediate volumes of beer or other liquid dispensed or to give other signals when the timing member is in its end position.

It is of course apparent that during normal filling of a glass, for example, the valve 38 will be closed by the bartender when the master switch contact 68 is in approximately the B position. Such closing will permit the spring 33 to return the timing member 25 rapidly to its initial position. The return motion is so rapid that the instantaneous engagement of the master switch contact 68 and the first switch contact 65 is of insufficient duration to actuate the counter 60, whereby this counter is actuated only during forward movements of the timing member. The same is true as the master switch contact 68 returns from a more advanced position and instantaneously engages the second switch contact 66 or the third switch contact 67. If the valve 38 is opened for one or more short periods of time to replace foam in the glass or pitcher each valve actuation will momentarily re-energize the solenoid 48 and the motor 44 but the short time the valve is opened for such incremental flow will be insufficient to cause the master switch contact 68 to move from its A position to engage the first switch contact 65. Correspondingly any glass or pitcher can be incrementally filled to displace foam without registering on any of the counters 60, 61 or 62.

Various changes and modifications can be made without departing from the spirit of the invention as defined in the appended claims.

We claim as our invention:

1. A monitoring device for monitoring the volume of liquid dispensed through a valve movable between open and closed positions, said monitoring device including in combination:

a switch and means for connecting same to said valve to actuate said switch upon movement of said valve from closed to open position;

a plurality of counters; and means operatively connecting said switch and said counters for actuating said counters sequentially in response to the elapsed time said valve is open.

2. A monitoring device for monitoring the volume of liquid dispensed through a valve movable between open and closed positions, said monitoring device including in combination:

first and second digital counters;
means for actuating said first digital counter upon opening of said valve for a predetermined short time; and
means for additionally activating said second digital counter in response to said valve remaining open for a predetermined longer period of time.

3. A monitoring device for monitoring the volume units of liquid dispensed through a valve movable between open and closed positions, said monitoring device including in combination:

a switch and means for connecting same to said valve to actuate said switch upon movement of said valve from closed to open position;
a first electric digital counter indicative of the number of smaller-unit volumes dispensed through said valve;
a second electric digital counter indicative of the number of larger-unit volumes dispensed through said valve; and
means operatively connecting said switch and said counters for advancing said first counter one unit in response to each valve opening continued for a first shorter length of time and for advancing said second counter one unit in response to each valve opening continued for a second longer period of time.

4. A monitoring device for monitoring the volume of liquid dispensed through a valve movable between open and closed positions, said monitoring device including in combination:

a stop element;
a timing member movable toward and away from said stop element;
biasing means for resiliently biasing said timing member to engage said stop element;
a motor;
clutch means operatively connecting and disconnecting said motor to said timing member to advance the latter in a direction away from said stop means toward an end position, said biasing means returning said timing member to engage said stop element upon disengagement of said clutch means;
means for operatively connecting said clutch means and said dispensing valve to engage said clutch means upon opening of said valve and throughout the time said valve remains open; and
means for registering the degree of movement of said timing member away from said stop means during the time said clutch means is engaged.

5. A monitoring device as defined in claim 4 in which said means for registering the degree of movement of said timing member includes first and second electric digital counters, first and second switches sequentially activated by said timing member during advancement of said timing member in said direction away from said stop element toward said end position, and circuits operatively connecting said first and second switches respectively to said first and second electric digital counters.

6. A monitoring device as defined in claim 5 including a third switch and means for actuating same after sequential actuation of said first and second switches during advancement of said timing member toward said end position, and means registering the actuation of said third switch.

7. A monitoring device for monitoring the volume units of liquid dispensed through a valve movable between open and closed positions, said monitoring device including in combination:

a first digital counter indicative of the number of smaller-unit volumes dispensed through said valve;
a second digital counter indicative of the number of larger-unit volumes dispensed through said valve;
a third digital counter indicative of any volume dispensed through said valve greater than said larger-unit volume; and
means for actuating said first, second and third counters in sequence during the time said valve remains open.

8. A monitoring device for monitoring the volume of liquid dispensed through a valve movable between open and closed positions, said monitoring device including in combination:

a mounting member carrying a stop element thereon;
a timing member pivotally connected to said mounting member and engageable with said stop element to determine an initial position of said timing member;
drive means for driving said timing member in a direction away from said initial position toward an end position;
biasing means for resiliently biasing said timing member toward said initial position;
means actuating said drive means in response to opening of said valve and for continuing such activation of said drive means throughout the time said valve remains open; and
means for recording the degree of angular movement of said timing member during such time as said valve remains open.

9. A monitoring device as defined in claim 8 in which said means for recording the degree of angular movement of said timing member includes a master switch contact carried by said timing member, first and second switch contacts sequentially engaged by said master switch contact upon movement of said timing member from said initial position toward said end position, first and second digital electric counters, and circuits connecting said first and second electric digital counters to said first and second switch contacts for actuation of said first and second counters in sequence during such movement of said timing element from said initial to said end position.

10. A monitoring device as defined in claim 9 including additionally a third switch contact engageable by said master switch contact upon movement of said timing element beyond the point of engagement of said master switch contact and said second contact, and means responsive to engagement of said master switch contact and said third switch contact.

11. A monitoring device as defined in claim 10 in which said master switch contact engages said third switch contact before said timing member reaches said end position, and including means for stopping the movement of said timing member when the latter is in said end position.

12. A monitoring device as defined in claim 8 in which said timing member provides a circular periphery, said drive means including an electric motor, a friction wheel driven thereby normally out of contact with the circular periphery of said timing member, and means for engaging said drive wheel and said circular periphery in response to opening of said valve.

13. A monitoring device as defined in claim 12 in which said means for engaging said drive wheel and said circular periphery includes means for pivoting said motor to said mounting member to move between a retracted position and an engaged position in which said drive wheel engages said periphery, means for biasing said motor toward said retracted position, a solenoid operatively connected to said motor to move same into said engaged position, and circuit means energizing said solenoid in response to opening of said valve.

14. A monitoring device as defined in claim 13 in which said circular periphery of said timing member includes a depression receiving said friction wheel and determining said end position of said timing member, said friction wheel rotating in holding engagement with the periphery of said timing member at a position adjacent said depression to hold said timing member in said end position during continued operation of said motor.

15. A monitoring device as defined in claim 8 in which said actuating means includes a switch operatively connected to said valve, a relay controlling the operation of said drive means, said relay having a relay winding, a low-voltage transformer having a low-voltage secondary winding, and means for connecting said switch, said relay winding and said low-voltage secondary winding in series circuit.

16. A monitoring device as defined in claim 8 in which said timing member includes a circular member coaxially mounted thereon, and in which said biasing means includes a cord at least partially encircling said circular member and attached thereto, a tension spring connected to said cord and means for anchoring said spring to said mounting member.

No references cited.

M. HENSON WOOD, JR., *Primary Examiner.*